United States Patent Office 3,340,937
Patented Sept. 12, 1967

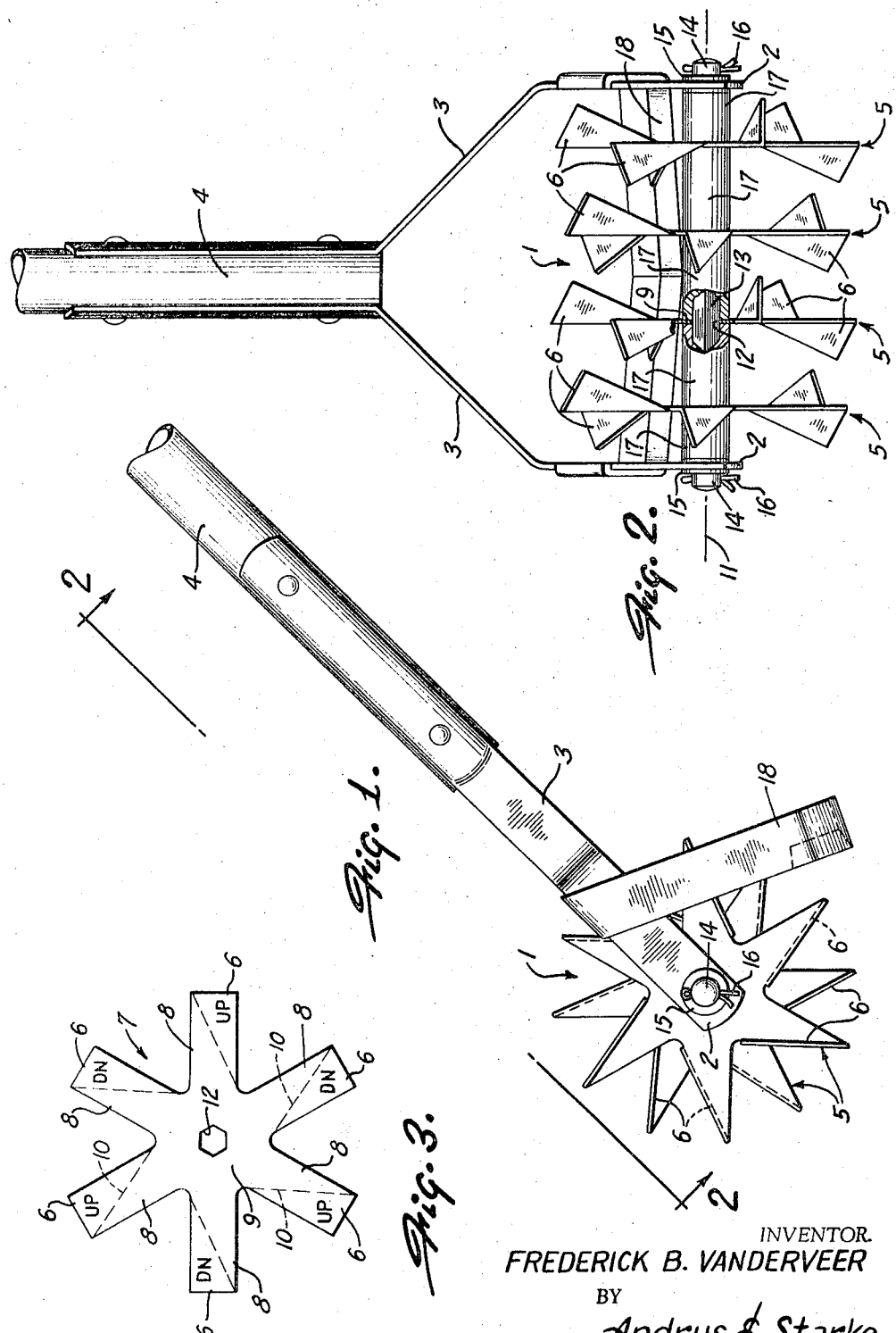

3,340,937
ROTARY CULTIVATOR
Frederick B. Vanderveer, Grand Rapids, Mich., assignor to Bissell Inc., Grand Rapids, Mich., a corporation of Michigan
Filed Nov. 4, 1964, Ser. No. 408,861
5 Claims. (Cl. 172—350)

This application relates to a rotary cultivator and has been applied in the construction of a manually operated garden cultivator, although it is adapted also for power operated field use.

The invention is based upon the discovery that greatly improved results in depth of penetration, fineness of soil disintegration, ease of operation and destruction of weeds, if the rotary blades are constructed and disposed relative to each other in generally corresponding transverse planes which for those blades beneath the horizontal axial plane of the cultivator project upwardly forwardly of the axis.

Such a construction provides an ease of penetration for each blade as the cultivator is pushed forwardly over the ground, and as each blade thereafter leaves the ground upon further rotation of the cultivator it tends to lift the dirt which effectively loosens and aerates the soil and at the same time aids in maintaining the desired penetration for the cultivator as a whole.

By providing this ease of penetration on the forward push stroke of the cultivator, and a free rolling of the cultivator on the reverse pull stroke, the manual effort needed for cultivating a given area of soil is reduced and made easier. However, should the soil or the terrain be such that it is desired to obtain greater penetration upon the pull stroke, the same cultivator may be turned over and so utilized.

The accompanying drawing illustrates the best mode presently contemplated by the inventor for carrying out the invention.

In the drawings:

FIGURE 1 is a side elevation of the cultivator;

FIG. 2 is a general front elevation of the cultivator taken on line 2—2 of FIG. 1 with parts broken away and sectioned; and FIG. 3 is a plan view of the plate metal blank from which a set of blades is formed.

The cultivator comprises in general a rotor 1 mounted for free rotation in end bearings 2 in the corresponding spaced arms 3 of the bifurcated yoke or frame end of handle 4 which extends upwardly and rearwardly at an angle for ready grasping by a standing operator for manipulation of the cultivator forward and back in a reciprocatory manner over the patch of soil to be cultivated.

The rotor 1 comprises a plurality of spaced sets 5 of blades 6, each set being formed integrally from a single plate metal blank 7 as illustrated in FIG. 3 wherein the blank is shown as having a plurality of radial arms 8 of generally rectangular shape merging into a common central hub portion 9. A blade 6 is formed upon each arm 8 by bending the angular portion laterally on the dotted lines 10 shown in FIG. 3 and which result in each laterally formed blade being disposed in a plane which is offset from the axis 11 of the rotor 1 in the direction previously described.

It is desirable to have every other blade 6 on a given blank 7 bent to one side of the plane of the hub 9, and to have the intermediate blades 6 bent to the other side of the plane, as indicated in FIG. 3 where every other blade is labeled to be bent "UP" and the intermediate blades are labeled to be bent "DN," meaning "down." Each blade 6 thus formed is of a triangular shape and is preferably flat. The outer edge of each blade is at an angle to the axis and to the surface of the ground so that penetration is initiated by a reasonably sharp point of the blade which additionally facilitates cutting into the ground.

In assembling the sets 5 each set has a preferably fluted or polygonal central hole 12 which receives a matching fluted or polygonal rod 13 so that all of the sets will turn together with the rod as the rotor 1 operates. The reduced end portions 14 of rod 13 are cylindrical to be journaled for rotation in arms 3, and a washer 15 applied over each end of rod 13 on the outer side of the corresponding arm 3 is suitably secured in place as by a cotter pin 16.

Where there are six equally spaced blades 6 for each blank 7 or set of blades, it is possible to make the shaft 13 hexagonal with the hole 12 for each blank 7 matching the same, so that in assembling the unit each successive disc or set of blades is turned one-sixth of a revolution relative to the next adjacent set, whereby the corresponding blades may alternate in direction for adjacent sets.

The sets 5 are spaced apart as indicated so that the blades of adjacent sets do not overlap laterally in operation. For this purpose short tubular spacers 17 are carried by rod 13 between adjacent sets and also between end sets and the corresponding arms 3.

If desired a fixed weed cutter 18 comprising a strip of metal disposed generally horizontally behind rotor 1 near the bottom thereof and having its ends bent upwardly and suitably secured to the corresponding arms 3. The horizontal blade portion of the weed cutter 18 is preferably sharpened on its forward edge as indicated and is disposed at an angle with its forward edge extending downwardly and the body of the blade extending rearwardly and upwardly.

With the construction illustrated the weed cutter blade 18 operates beneath the loosened soil and cuts the weeds at their roots.

The rotor is designed to operate principally on a forward push motion when the weed cutter is used. When it is desired to avoid use of the weed cutter the cultivator is turned over and then the rotor operates principally on a pull motion like a hoe except that it is a more continuous motion.

The construction of the blades at the angle indicated provides a more effective penetration of the ground when the cultivator is manually manipulated as described.

Various modes of carrying out the invention are contemplated as being within the scope of the following claims particularly pointing out and distinctly claiming the subject matter which is regarded as the invention.

I claim:

1. A manually operable rotary cultivator comprising a rotor made up of a plurality of axially spaced sets of blades mounted to rotate together on a common axle, means journaling said axle in the spaced end portions of a frame, and a handle rigidly constituting an extension of said frame upwardly and rearwardly of said rotor for grasping by a standing operator and reciprocal manipulation of the rotor over the ground to be tilled by a forward and backward push-pull movement, each said set of blades comprising a plate metal disk having a plurality of radially extending arms with a substantially triangularly shaped blade bent laterally therefrom at the outer end portion thereof upon a fold line that disposes the blades in the bottom half of the rotor and which generally engage the ground at or below the surface at any given time in corresponding individual planes intersecting the horizontal plane of the axle forwardly of said axle whereby forward pushing of the cultivator by the operator effects easy penetration of the unbroken ground by successive blades in advance of the rotor as the rotor rolls over the ground and whereby the blades emerging from the ground to the rear of the rotor tend to lift the soil and aerate the same.

2. The construction of claim 1 in which alternate blades on each disk are bent laterally in opposite directions.

3. The construction of claim 1 and means securing each set of blades against turning relative to said axle and each other.

4. The construction of claim 1 in which the cultivator is adapted to be turned over to operate upside down whereby a rearward pull of the cultivator by the operator effects easy penetration of the ground by successive blades in advance of the rotor as the rotor rolls over the ground toward the operator.

5. The construction of claim 1 and a weed cutter bar rigidly secured to said frame and disposed substantially horizontally and transverse to said rotor behind the same at a level near the bottom of the rotor.

References Cited

UNITED STATES PATENTS

| 396,374 | 1/1889 | Sherman | 172—548 |
| 658,462 | 9/1900 | Perry | 172—548 X |
| 747,118 | 12/1903 | Barker | 172—350 X |

FOREIGN PATENTS 852,420  10/1960  Great Britain.

ABRAHAM G. STONE, *Primary Examiner.*

J. R. OAKS, *Assistant Examiner.*